United States Patent [19]

Saito et al.

[11] Patent Number: 5,560,445
[45] Date of Patent: Oct. 1, 1996

[54] CONTAINING STRUCTURE FOR VEHICLE LOCK DEVICE IN MOTORCYCLE

[75] Inventors: Naoyuki Saito; Tetsuo Suzuki; Yorikata Showji; Katsunori Funabashi; Masayuki Dazai; Shinji Sumitani, all of Saitama, Japan

[73] Assignee: Honda Giken Kogyo Kabushiki Kaisha, Tokyo, Japan

[21] Appl. No.: 310,324

[22] Filed: Sep. 22, 1994

[30] Foreign Application Priority Data

Sep. 22, 1993 [JP] Japan .................. 5-261653

[51] Int. Cl.⁶ .................................................. B62J 7/02
[52] U.S. Cl. .................. 180/219; 70/233; 224/413; 224/935; 297/188.1
[58] Field of Search .................. 180/219; 70/233, 70/261; 224/275, 39; 297/188.09, 188.1

[56] References Cited

U.S. PATENT DOCUMENTS

| 3,779,597 | 12/1973 | Uchida | 297/188.1 |
|---|---|---|---|
| 4,171,731 | 10/1979 | Hilber | 297/188.1 |
| 4,436,232 | 3/1984 | Zane et al. | 224/39 |
| 4,915,188 | 4/1990 | Ota et al. | 180/219 |
| 5,107,949 | 4/1992 | Gotoh et al. | 180/219 |
| 5,179,848 | 1/1993 | Kief | 70/233 |
| 5,251,796 | 10/1993 | Shelhart | 224/39 |

FOREIGN PATENT DOCUMENTS

| 0079798 | 5/1983 | European Pat. Off. . |
|---|---|---|
| 0492742 | 7/1992 | European Pat. Off. . |
| 56-120464 | 9/1981 | Japan . |
| 58-126270 | 7/1983 | Japan . |
| 4-279887 | 10/1992 | Japan .................. 224/39 |
| 155626 | 1/1921 | United Kingdom . |

*Primary Examiner*—Karin L. Tyson
*Attorney, Agent, or Firm*—Birch, Stewart, Kolasch & Birch, LLP

[57] ABSTRACT

A vehicle lock device having an approximately U-shaped fixing portion is contained so as not to be seen from the exterior. An approximately U-shaped fixing portion is disposed within a containing portion formed on a rear fender so as to be longer in the longitudinal direction. A lock portion longer in the vehicle width direction is overlapped on the fixing portion so as to cross the fixing portion. The fixing portion and the lock portion are fixed to a hook of a cross-plate and stays of seat rails by means of a fixture. A seat is then mounted on the seat rails. The vehicle device can be thus contained so as not to be seen from the exterior.

20 Claims, 6 Drawing Sheets

CONTAINING STRUCTURE FOR VEHICLE LOCK DEVICE IN MOTORCYCLE

BACKGROUND OF THE INVENTION

1. Field of the Invention

The present invention relates to a containing structure for containing a vehicle lock device in a motorcycle which includes an approximately U-shaped fixing portion and a lock portion mounted at both ends of the fixing portion for free locking.

2. Description of Background Art

The containing structure according to the present invention is not available in the prior art. A technique is known wherein a flexible lock device such as a wire or chain is removably positioned in a frame pipe. For example, as set forth in Unexamined Japanese Patent Publication No. SHO 56-120464 such a flexible lock device is disclosed. Moreover, Unexamined Japanese Patent Publication No. SHO 58-126270 discloses a technique in which a U-shaped lock device is mounted on a vehicle in a state to be exposed at the time of not being in use.

SUMMARY AND OBJECTS OF THE INVENTION

A vehicle lock device including a non-flexible fixing portion with an approximate U-shape and a lock portion has a relatively large size. Therefore, it is difficult to contain such a vehicle lock device in the state not to be seen from the exterior at the time of not being in use. An object of the present invention is to solve this problem.

According to the present invention, there is provided a containing structure for containing a vehicle lock device in a motorcycle which includes an approximate U-shaped fixing portion and a lock portion mounted at both ends of the fixing portion for free locking, wherein a containing portion for containing the fixing portion is provided on a rear fender under a seat. The fixing portion is disposed within the containing portion so as to be longer in the longitudinal direction using positioning ribs erected in the containing portion. The lock portion is overlapped on an intermediate portion of the fixing portion so as to cross the fixing portion in the vehicular width direction. At least either of the lock portion and the fixing portion is fixed on the vehicle body by means of a fixing member.

According to the present invention, a vehicle lock device is separated into a fixing portion and a lock device. The fixing portion is disposed within a containing portion of a rear fender so as to be longer in the longitudinal direction, and a lock portion is overlapped on the fixing portion so as to be across the fixing portion longer in the vehicle width direction. At least either of the fixing portion and the lock device is fixed on the vehicle body and a seat is covered over them. The vehicle lock device can be thus contained between the sheet and the rear fender in the state not to be seen from the exterior.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
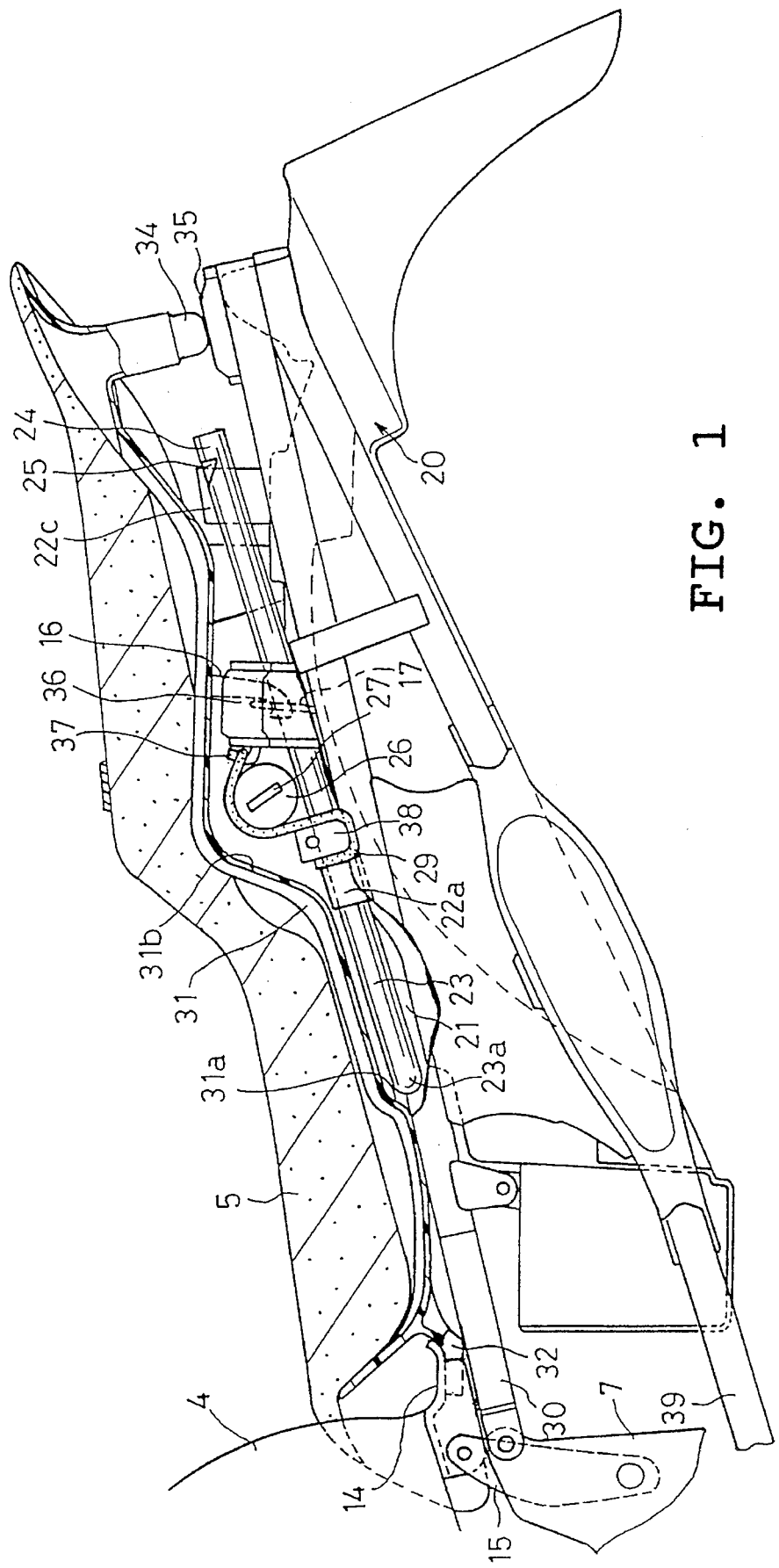
FIG. 1 is a sectional side view showing a state where a vehicle lock device of a first embodiment is contained with a seat cut away.
Figure 2:
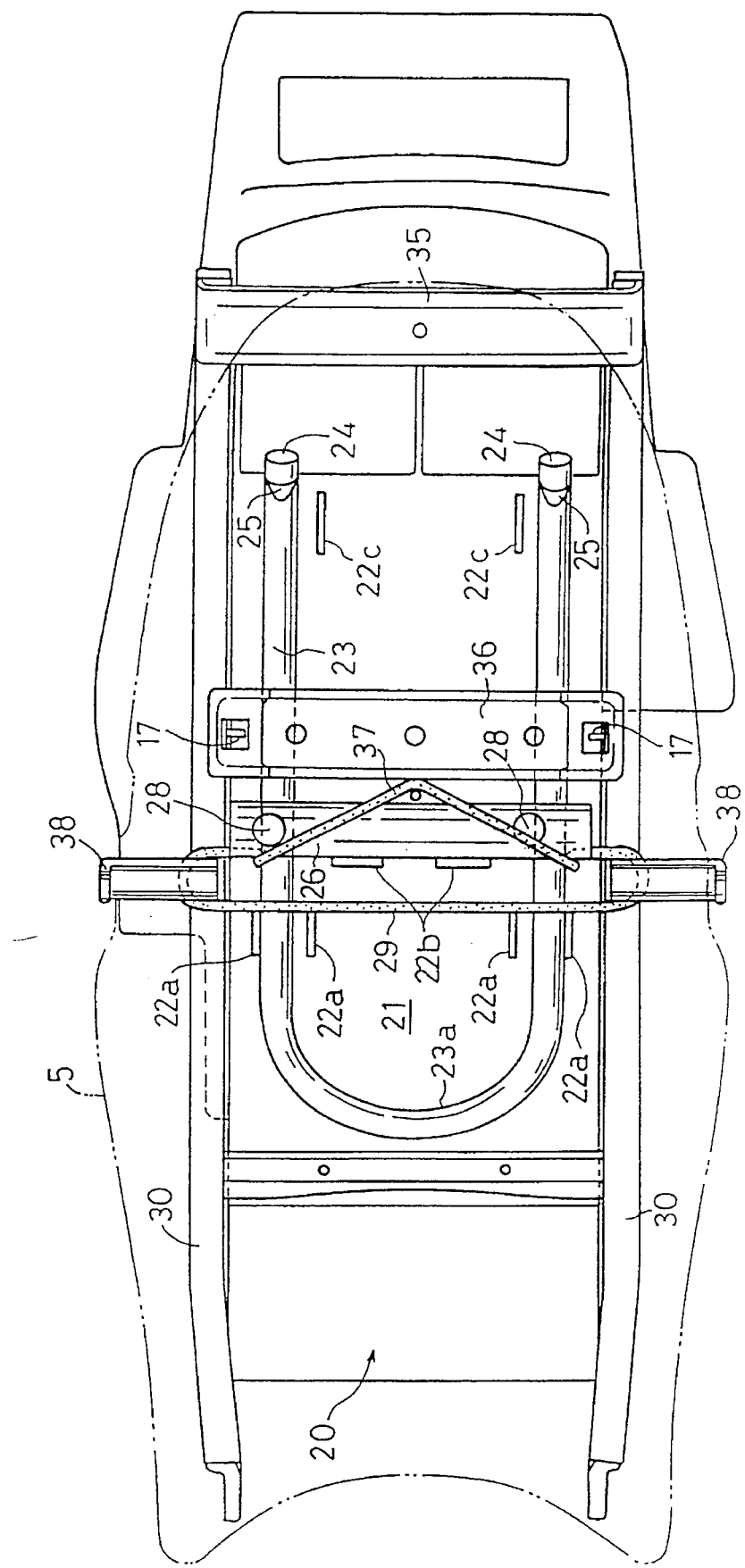
FIG. 2 is a plan view of FIG. 1.
Figure 3:
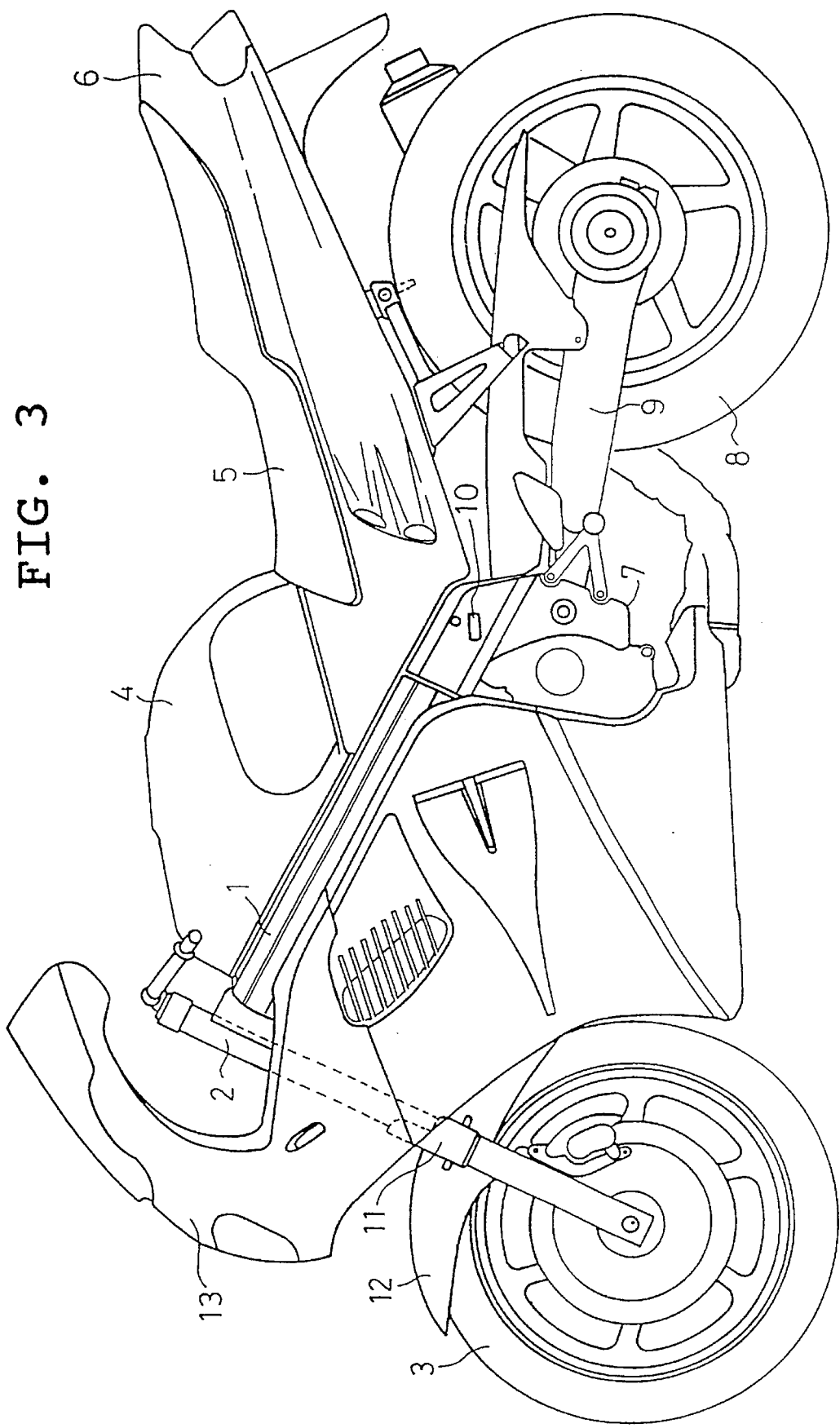
FIG. 3 is a side view of a motorcycle to which the first embodiment is applied.

One embodiment will be described with reference to FIGS. 1 to 4. FIG. 1 is a sectional side view showing a state where a vehicle lock device is contained. FIG. 2 is a plan view of FIG. 1. FIG. 3 is a side view showing the whole appearance of a motorcycle to which the embodiment is applied.

As illustrated in FIG. 3, a front fork 2 is supported at the front end of a main frame 1. A front wheel 3 is supported at the lower end of the front fork 2. A fuel tank 4 is supported on the main frame 1, and a seat 5 is disposed behind the fuel tank 4. The lower portion of the seat 5 is covered by a rear cover 6.

Pivot brackets 7 are provided on the rear end portion of the main frame 1. The pivot brackets 7 pivotably support the front ends of rear arms 9 for mounting a rear wheel 8 at the rear ends thereof in a cantilever manner.

A lock hole 10, for mounting a vehicle lock device, is provided on the upper portion of each of the pivot brackets 7. In addition, fork stays (to be described later) at the intermediate portion of the front fork 2 are mounted to a front fender 12. The front side and the right and left sides of the vehicle are covered with a fairing 13.

As is apparent from FIGS. 1 and 2, a containing portion 21, see FIG. 2, is provided on the upper portion of a rear fender 20 provided under the seat 5. An approximately U-shaped fixing portion 23 is contained within the containing portion 21 using positioning ribs 22a, 22b, and 22c so as to extend longer in the longitudinal direction with both fixing ends 24 directed rearward. A fixing recessed portion 25 is formed at each of the fixing ends 24.

A lock portion 26, which extends in the vehicle width direction, is overlapped on the intermediate portion of the fixing portion 23 so as to cross the fixing portion. A key hole 27, see FIG. 1, is provided at one end of the lock portion 26, and lock holes 28, see FIG. 2, to which the fixing ends 24 are fitted, are provided on the outer peripheral portions on both the end sides.

The lock portion 26 is a cylindrical member having a lock mechanism which achieves locking when both the fixing ends 24 of the fixing portion 23 are fitted in the lock holes 28 and are engaged therewith at the respective recessed portions 25. The locking is released using a key, not shown, inserted in the key hole 27. The lock portion 26 is removably fixed on the vehicle body side together with the fixing portion 23 by means of a fixture 29 constituted of a ring-like rubber band.

The seat 5 is supported on a pair of right and left seat rails 30 extending obliquely upward and rearward from the rear portion of the main frame 1. Engaging portions 32, formed at the front end portion of a bottom plate 31 of the seat 5, are inserted in and engaged with brackets 14 provided at the rear end portion of the fuel tank 4. The fuel tank 4 is mounted on brackets 15 projecting from the pivot brackets 7. At the intermediate portion of the seat 5, hooks 16 projecting downward from the bottom plate 31 are removably engaged with engaging portions 17 of the seat lock. A projecting portion 34 at the rear end of the bottom plate 31 abuts on a cross plate 35 crossing between the rear ends of the seat rails 30. By releasing the engagement between the hooks 16 and the engaging portions 17 and removing the engaging portions 32 from the brackets 14, the whole seat 5 can be removed from the seat rails 30.

In addition, as shown in FIG. 1, the right and left ends of the lock portion 26 are positioned in a recessed portion 31b formed at the rear surface of the bottom plate 31, and are restricted in the right and left direction by the abutment thereof on the side walls of the recessed portion.

A cross plate 36 traversing near the rear side of the lock portion 26 is provided between the right and left seat rails 30. The fixture 29 is fixed using a hook 37 provided at the center portion of the cross plate 36. A pair of stays 38 are provided on the right and left seat rails near the front side of the lock portion 26 so as to project outward. A rear stay 39 is operatively mounted beneath the seat 5.

Figure 4:
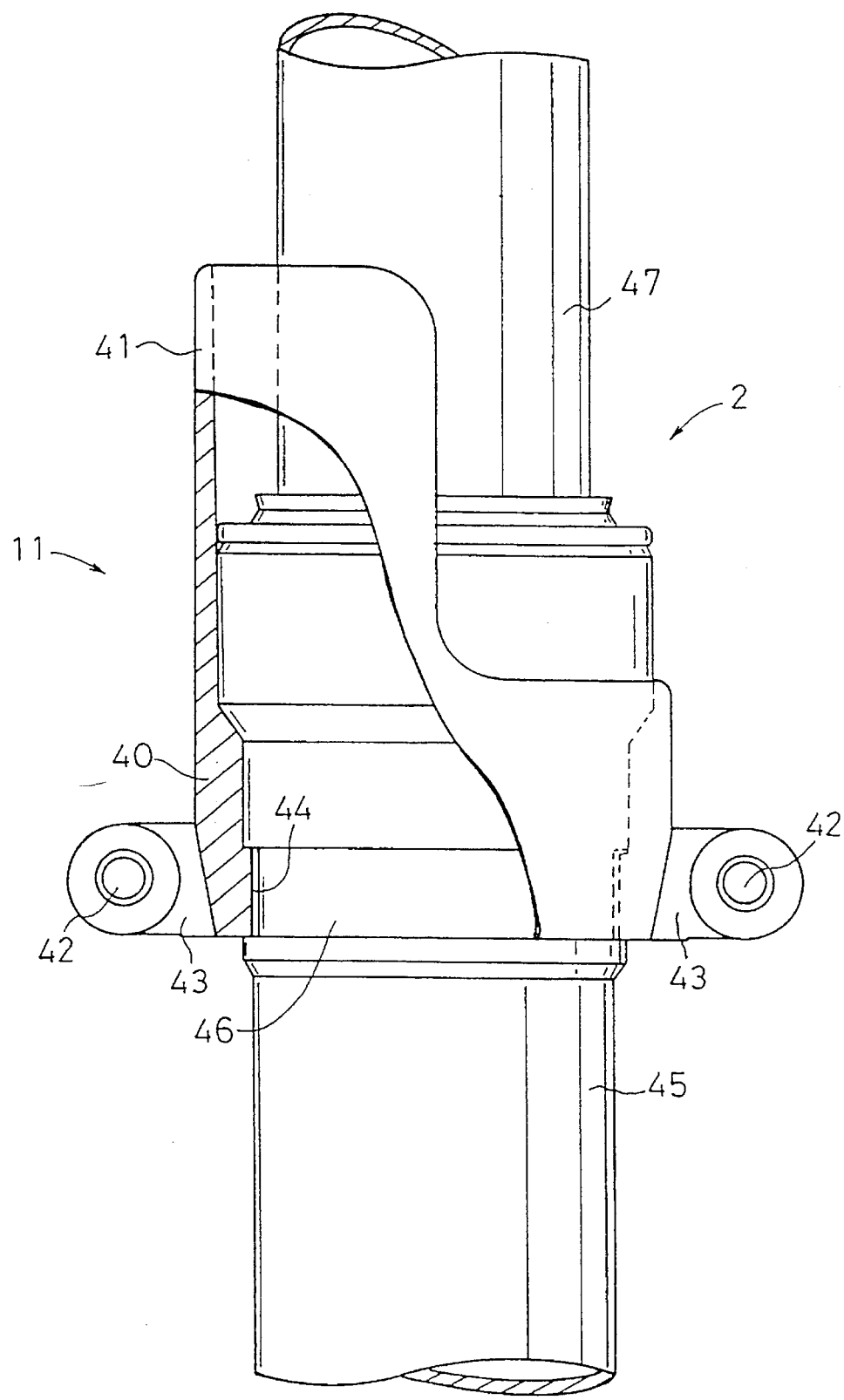
FIG. 4 is a partially cut-away view showing the essential portion of the first embodiment.

FIG. 4 shows a detailed structure of the fork stay 11, wherein a fender stay portion 40 and a chipping guard portion 41, which are conventionally separated from each other, are integrated with each other.

The fender stay portion 40 is mounted on the front fender 12 by means of a mounting leg 43 having bolt through holes 42. An inwardly projecting portion 44 formed on the inner surface is fitted in a ring groove 46 formed around the outer periphery at the upper end portion of an outer pipe 45 constituting the front fork 2. Moreover, the chipping guard portion 41 integrally extending upward from the fender stay portion 40 guards the front and side surfaces of the inner pipe 47.

The conventional chipping guard can be mounted only on the front fork previously formed with a slip-off groove. However, this restriction is eliminated in this embodiment and the chipping portion 41 can be provided later. When being used for a tilting type front fork, the chipping guard portion 41 is provided so as to be directed downward.

The function of the embodiment will be described below. Referring to FIGS. 1 and 2, the vehicle lock device is contained by the steps of removing the seat 5 from the seat rails 30 to expose the containing portion 21; separating the fixing portion 23 from the lock portion 26; allowing the fixing portion 23 from the upper side of the containing portion 21 to pass through the lower side of the cross plate 36 with a curved portion 23a being directed forward; and disposing the fixing portion 23 longer in the longitudinal direction.

At this time, the right and left portions of the fixing portion 23 are positioned by the ribs 22a and 22c. The curving portion 23a on the front side is positioned by the projecting portion 31a formed on the rear surface of the bottom plate 31.

The lock portion 26 is then disposed longer in the right and left direction between the ribs 22b and cross plate 36, and is overlapped with the fixing portion 23 so as to cross the fixing portion 23. The front and rear portions of the lock portion 26 are also positioned by the rib 22b and the cross plate 36.

The fixture 29 is hung between the right and left stays 38, and further, the portion of the fixture 29 is made to pass through the upper side of the lock portion 26 and is hung from the hook 37 so that the lock portion 26 and the fixture 29 are fixed on the vehicle body side by the fixture 29.

By mounting the seat 5 on the seat rails 30, the vehicle lock device is contained between the seat 5 and the rear fender 20 and is not to be seen from the exterior. By covering the seat 5, the lock portion 26 is put in the recessed portion 31 formed on the bottom plate 31, so that the right and left portions of the lock device are positioned.

As is apparent from FIG. 2, suitable gaps are provided between the ribs 22a, 22b, 22c and the fixing portion 23. This is an allowance for permitting the size difference in each of the fixing portion 23 and the lock portion 26 in the case of using a vehicle lock device having a different size.

When the vehicle lock device is used, the one end side of the previously separated fixing portion 23 is made to pass through the lock hole 10 and is wound around a fixing member for parking, for example, a telephone post, and the fixing ends 24 are fitted in the lock holes 28 of the lock portion 26 to complete the locking. The frame portion, pivot brackets 7, is directly locked, and thereby the motorcycle is certainly parked not to be moved by another person.

Figure 5:
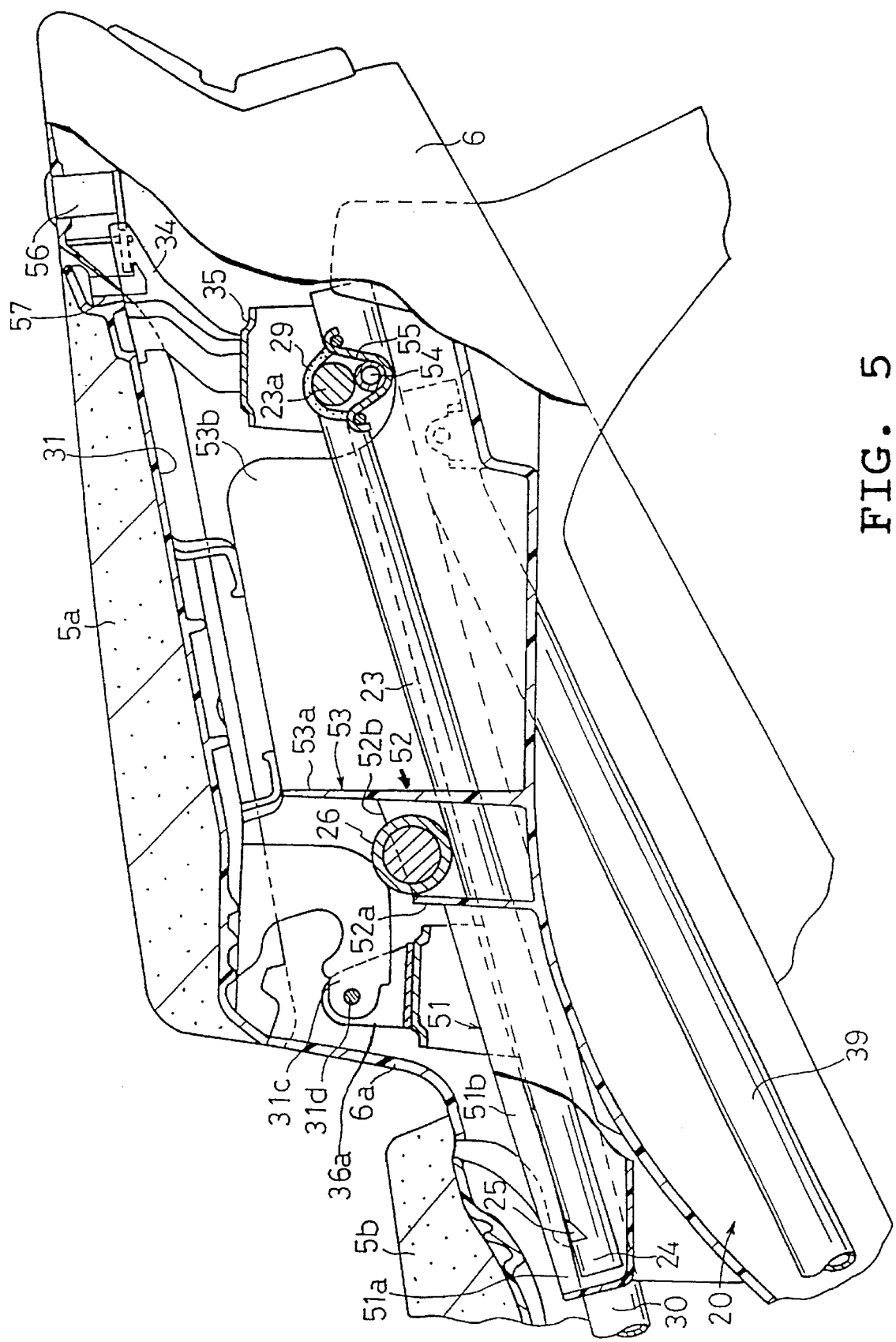
FIG. 5 is a sectional side view, similar to FIG. 1, showing a second embodiment.
Figure 6:
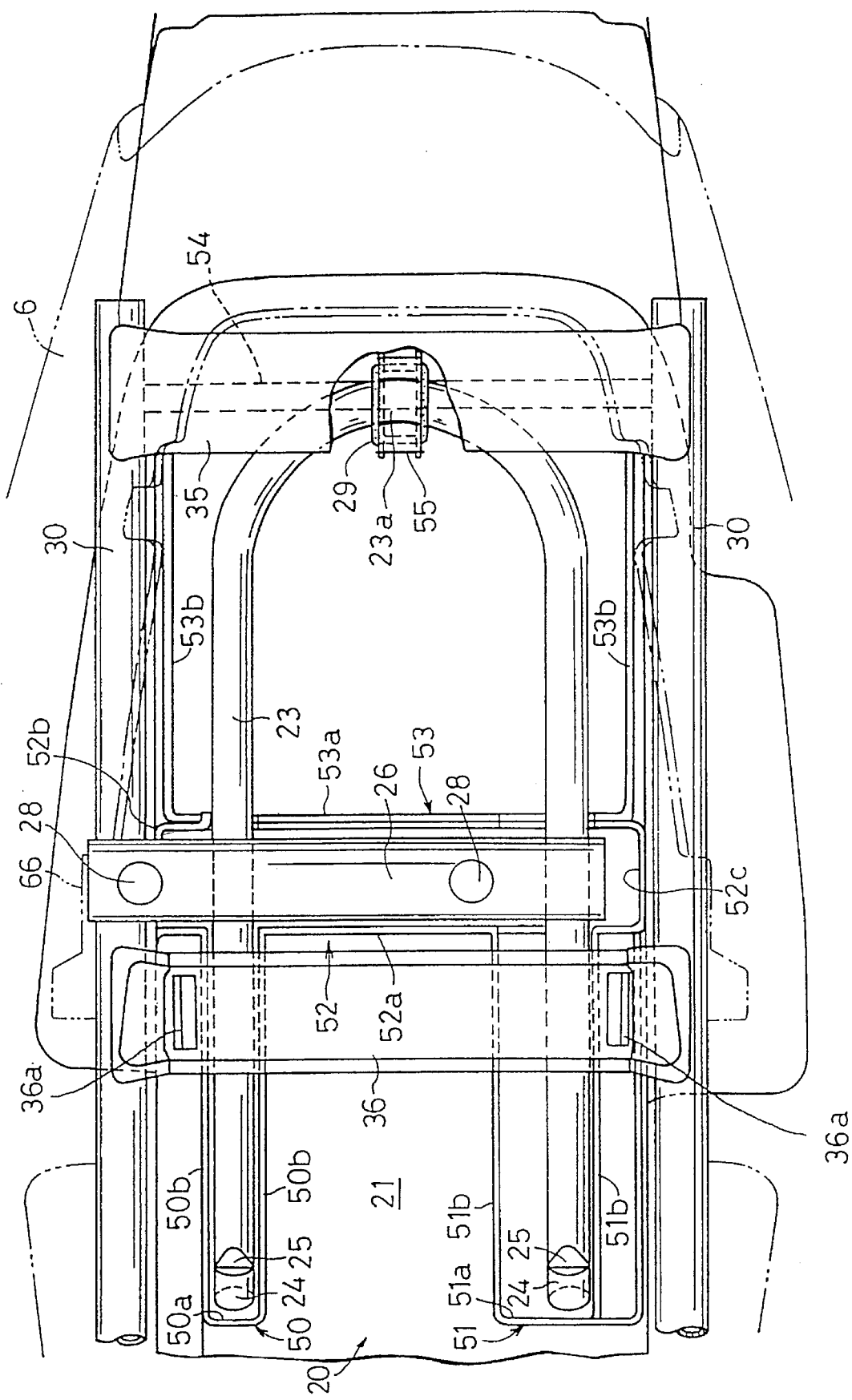
FIG. 6 is a plan view, similar to FIG. 2, showing the second embodiment.

FIGS. 5 and 6 show another embodiment in which a vehicle lock device is contained under a rear seat 5a of a tandem seat. Parts corresponding to those in the previous embodiment are designated by the same reference numerals.

In this embodiment, the rear seat 5a is provided so as to be freely tilted on an upper opening portion of a box-like portion 6a formed on the rear portion of the rear cover 6, and hinges 31c projecting downward from the front end portion of the bottom plate 31 of the rear seat 5a are mounted by means of a shaft 31d on brackets 36a projecting from the right and left ends of the cross plate 36.

On the right and left sides of a front half portion of a containing portion 21, which are provided on a rear fender 20 and are mainly surrounded by the box-like portion 6a, there are formed partitioning portions 50 and 51 which are formed in box-shapes being opened upward and which extend in the longitudinal direction so as to contain right and left fixing ends 24 of a fixing portion 23. In addition, erecting walls 50a and 51a at the leading edges of the partitioning portions 50 and 51 function to position the right and left fixing ends 24 in the forward direction.

A partitioning portion 52 longer in the vehicle width direction is provided near the cross plate 36, and a lock portion 26 is contained therein. The front wall 52a of the partitioning portion 52 is connected to the rear ends of the right end left walls 50a and 51b of the partitioning portions 50 and 51. In the lock portion 26, the left end is in the inner side from the left side erecting wall 52c, while the right end passes through the right side erecting wall 52b of the partitioning portion 52 and extends outward, and is positioned by an edge portion 6b formed at the portion of the rear cover 6.

A wall 53 surrounding substantially the half portion of the fixing portion 23 on the curved portion 23a side is formed behind the partitioning portion 52. A front wall 53a of the wall 53 is integrated with the rear wall of the partitioning portion 52, and right and left walls 53b of the wall 53 are formed along the vicinities of the seat rails outside the fixing portion 23. Cut-out portions for passing the right and left portions of the fixing portion 23 therethrough are formed on the front wall 53a. The curved portion 23a inserted in the wall 53 is overlapped on a hook 55 mounted at the center portion of a cross pipe 54 under the cross plate 35, and is fixed thereto by a fixture 29.

A hook 57 provided at the rear end of the rear seat 5a is engaged and disengaged by a seat lock 56 mounted on the top surface of the rear cover 6. As illustrated in FIG. 5, a front seat 5b is mounted to the left of the rear seat 5a of the tandem seat.

The vehicle lock device in this embodiment is contained by the steps of raising the rear seat 5a to open the box-like portion 6a, inserting the fixing portion 23 in the box-like portion 6a, allowing the fixing portion 23 to pass under the cross plate 36 with the fixing ends 24 directed forward and containing the right and left portions of the fixing portion 23 in the partitioning portions 50 and 51, and allowing the curved portion 23a to pass under the cross plate 35 and fixing it on the hook 55 side by the fixture 29.

Subsequently, the lock portion 26 as inserted in the partitioning portion 52 and is overlapped on the fixing portion 23 so as to be across the fixing portion 23. This closes the rear seat 5a, thereby certainly containing the vehicle device which is not to be seen from the exterior.

In addition, the partitioning portions 50, 51 and 52 are formed to be large in width so as to contain the vehicle lock device having a different size.

In a vehicle lock device of the present invention, an approximately U-shaped fixing portion is disposed within a containing portion of a rear fender so as to be longer in the longitudinal direction, and a lock portion longer in the vehicle width direction is overlapped on the fixing portion so as to cross it. Accordingly, the lock device, which is not flexible and has a relatively large size, can be contained between a seat and the rear fender, thereby making it possible to solve the problem in the appearance at the time of not being in use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A containing structure for containing a vehicle lock device in a motorcycle comprising:
   a seat being positioned on said motorcycle above a rear wheel fender of said motorcycle, said seat including an upper portion and a lower portion;
   a recess being formed between said lower portion of said seat and said rear wheel fender, said recess being not visible from the exterior of said seat during normal use, a depth of said recess being substantially less than a length of said seat;
   a pair of longitudinally extending spaced-apart seat rails for supporting said seat;
   a cross plate extending between said seat rails and including retaining means for operatively, removably securing said seat to said motorcycle;
   an elongated lock fixing portion being removably secured within said recess below said cross plate;
   a locking portion adapted to be removably secured to said elongated lock fixing portion, said locking portion being disposed adjacent to said elongated lock fixing portion within said recess; and
   a fixing member for removably securing said elongated lock fixing portion to said motorcycle.

2. The containing structure according to claim 1, wherein said elongated lock fixing portion is disposed within said recess so as to extend along a longitudinal direction thereof.

3. The containing structure according to claim 1, and further including positioning ribs disposed within said recess for accommodating a plurality of sizes of elongated lock fixing portions.

4. The containing structure according to claim 1, wherein said elongated lock fixing portion is U-shaped.

5. The containing structure according to claim 1, wherein said locking portion overlaps an intermediate portion of said elongated lock fixing portion so as to cross the elongated lock fixing portion in a motorcycle width direction.

6. The containing structure according to claim 1, wherein said cross plate includes at least one hook for securing said elongated lock fixing portion to said motorcycle.

7. A containing structure for containing a vehicle lock device in a motorcycle comprising:
   a seat being positioned on said motorcycle above a rear wheel fender of said motorcycle, said seat including an upper portion and a lower portion;
   a recess being formed between said lower portion of said seat and said rear wheel fender, said recess being not visible from the exterior of said seat during normal use, a depth of said recess being substantially less than a length of said seat;
   a pair of longitudinally extending spaced-apart seat rails for supporting said seat;
   a cross plate extending between said seat rails and including retaining means for operatively, removably securing said seat to said motorcycle;
   an elongated lock fixing portion being removably secured within said recess below said cross plate;
   a locking portion adapted to be removably secured to said elongated lock fixing portion, said locking portion being disposed adjacent to said elongated lock fixing portion within said recess; and
   a fixing member for removably securing said locking portion to said motorcycle.

8. The containing structure according to claim 7, wherein said elongated lock fixing portion is disposed within said recess so as to extend along a longitudinal direction thereof.

9. The containing structure according to claim 7, and further including positioning ribs disposed within said recess for accommodating a plurality of sizes elongated lock of fixing portions.

10. The containing structure according to claim 7, wherein said elongated lock fixing portion is U-shaped.

11. The containing structure according to claim 7, wherein said locking portion overlaps an intermediate portion of said elongated lock fixing portion so as to cross the elongated lock fixing portion in a motorcycle width direction.

12. The containing structure according to claim 7, wherein said cross plate includes at least one hook for securing said locking portion to said motorcycle.

13. A containing structure for containing a vehicle lock device in a motorcycle comprising:
   a tandem seat including a front seat and a rear seat, said tandem seat being positioned on said motorcycle above a rear wheel fender of said motorcycle, said seat including an upper portion and a lower portion;
   a recess being formed between said lower portion of said rear seat of said tandem seat and said rear wheel fender, said recess being not visible from the exterior of said tandem seat during normal use, a depth of said recess being substantially less than a length of said seat;

a pair of longitudinally extending spaced-apart seat rails for supporting said seat;

a cross plate extending between said seat rails and including retaining means for operatively, removably securing said tandem seat to said motorcycle;

an elongated lock fixing portion being removably secured within said recess below said cross plate;

a locking portion adapted to be removably secured to said elongated lock fixing portion, said locking portion being disposed adjacent to said elongated lock fixing portion within said recess; and a fixing member for removably securing said elongated lock fixing portion to said motorcycle.

14. The containing structure according to claim 13, wherein said elongated lock fixing portion is disposed within said recess so as to extend along a longitudinal direction thereof.

15. The containing structure according to claim 13, and further including positioning walls disposed within said recess for accommodating a plurality of sizes elongated lock of fixing portions.

16. The containing structure according to claim 13, wherein said elongated lock fixing portion is U-shaped.

17. The containing structure according to claim 13, wherein said locking portion overlaps an intermediate portion of said elongated lock fixing portion so as to cross the elongated lock fixing portion in a motorcycle width direction.

18. A containing structure for containing a vehicle lock device in a motorcycle comprising:

a containing portion for containing articles, said containing portion being provided on a rear fender under a seat, a depth of said containing portion being substantially less than a length of said seat;

a cross plate extending through said containing portion between a pair of spaced-apart seat rails;

an approximately U-shaped fixing portion;

a lock portion adapted to be manually mounted at both ends of said fixing portion;

said fixing portion being disposed within said containing portion below said cross plate so as to extend in a longitudinal direction;

said lock portion overlapping on an intermediate portion of said fixing portion so as to cross the fixing portion in the motorcycle width direction; and at least either of said lock portion and said fixing portion being fixed on the motorcycle body by means of a fixing member.

19. The containing structure according to claim 18, and further including positioning ribs disposed within said containing portion for accommodating a plurality of sizes of fixing portions.

20. The containing structure according to claim 18, wherein said fixing member includes at least one hook for securing either of said lock portion and said fixing portion to said motorcycle.

* * * * *